(12) United States Patent
Cheiky

(10) Patent No.: US 7,966,990 B2
(45) Date of Patent: *Jun. 28, 2011

(54) INJECTOR-IGNITION FOR AN INTERNAL COMBUSTION ENGINE

(75) Inventor: Michael Cheiky, Thousand Oaks, CA (US)

(73) Assignee: Transonic Combustion, Inc., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/464,790

(22) Filed: May 12, 2009

(65) Prior Publication Data

US 2009/0255508 A1    Oct. 15, 2009

Related U.S. Application Data

(63) Continuation of application No. 11/692,105, filed on Mar. 27, 2007, now Pat. No. 7,546,826.

(60) Provisional application No. 60/787,964, filed on Mar. 31, 2006.

(51) Int. Cl.
*F02B 3/00* (2006.01)
*F02B 3/06* (2006.01)

(52) U.S. Cl. ........................................ 123/298

(58) Field of Classification Search ............... 123/297, 123/298, 304, 549, 558, 670; 239/135; 137/334, 137/336

See application file for complete search history.

(56) References Cited

U.S. PATENT DOCUMENTS

| | | | |
|---|---|---|---|
| 4,644,925 A | | 2/1987 | Hoppie et al. |
| 4,669,433 A | * | 6/1987 | Hoppie et al. ............ 123/276 |
| 6,276,347 B1 | * | 8/2001 | Hunt ........................ 123/549 |
| 6,390,076 B2 | * | 5/2002 | Hunt ........................ 123/549 |
| 6,698,412 B2 | * | 3/2004 | Dalla Betta ............... 123/670 |
| 6,779,513 B2 | * | 8/2004 | Pellizzari et al. .......... 123/549 |
| 6,820,598 B2 | * | 11/2004 | Pellizzari et al. .......... 123/549 |
| 7,059,307 B2 | * | 6/2006 | Pellizzari et al. .......... 123/549 |
| 7,137,383 B2 | * | 11/2006 | Linna et al. ............... 123/549 |
| 7,444,230 B2 | * | 10/2008 | Cheiky ..................... 701/106 |
| 7,546,826 B2 | * | 6/2009 | Cheiky ..................... 123/297 |
| 2001/0010338 A1 | * | 8/2001 | Ganan-Calvo ............... 239/8 |

(Continued)

FOREIGN PATENT DOCUMENTS

GB         2307513 A       5/1997

(Continued)

OTHER PUBLICATIONS

Supplementary Partial European Search Report for EP App. No. 07754414, completed Feb. 19, 2010.

(Continued)

*Primary Examiner* — Mahmoud Gimie
(74) *Attorney, Agent, or Firm* — Sheppard Mullin Richter & Hampton LLP; David E. Heisey

(57) ABSTRACT

The present invention provides a heated catalyzed fuel injector that dispenses fuel substantially exclusively during the power stroke of an internal combustion engine, wherein ignition occurs in a fast burn zone at high fuel density such that a leading surface of the fuel is completely burned within several microseconds. In operation, the fuel injector precisely meters instantly igniting fuel at a predetermined crank angle for optimal power stroke production. Specifically, the fuel is metered into the fuel injector, such that the fuel injector heats, vaporizes, compresses and mildly oxidizes the fuel, and then dispenses the fuel as a relatively low pressure gas column into a combustion chamber of the engine.

25 Claims, 11 Drawing Sheets

U.S. PATENT DOCUMENTS

| | | |
|---|---|---|
| 2003/0178009 A1 | 9/2003 | Pellizzari et al. |
| 2005/0056247 A1 | 3/2005 | Durling |
| 2006/0107586 A1 | 5/2006 | Tavlarides et al. |
| 2010/0017099 A1 | 1/2010 | Becker |
| 2010/0126471 A1 | 5/2010 | Cheiky |
| 2010/0176686 A1 | 7/2010 | Diamond |
| 2010/0180866 A1 | 7/2010 | Becker |
| 2010/0194238 A1 | 8/2010 | Frick |
| 2010/0201290 A1 | 8/2010 | Becker |
| 2010/0201291 A1 | 8/2010 | Cheiky |
| 2010/0204901 A1 | 8/2010 | Cheiky |

FOREIGN PATENT DOCUMENTS

| | | | |
|---|---|---|---|
| JP | 10141170 A | * | 5/1998 |
| WO | 2005/042965 A1 | | 5/2005 |

OTHER PUBLICATIONS

Supplementary Partial European Search Report for EP App. No. 07754415, completed Mar. 1, 2010.

Supplementary Partial European Search Report for EP App. No. 07754416, completed Mar. 8, 2010.

U.S. Appl. No. 12/778,001, David E. McCann.

U.S. Appl. No. 12/817,136, Michael J. Frick.

U.S. Appl. No. 12/779,786, Michael C. Cheiky.

U.S. Appl. No. 12/755,591, David E. McCann.

U.S. Appl. No. 12/721,499, Jeffrey Bluen.

U.S. Appl. No. 12/534,738, Eric Plambeck.

* cited by examiner

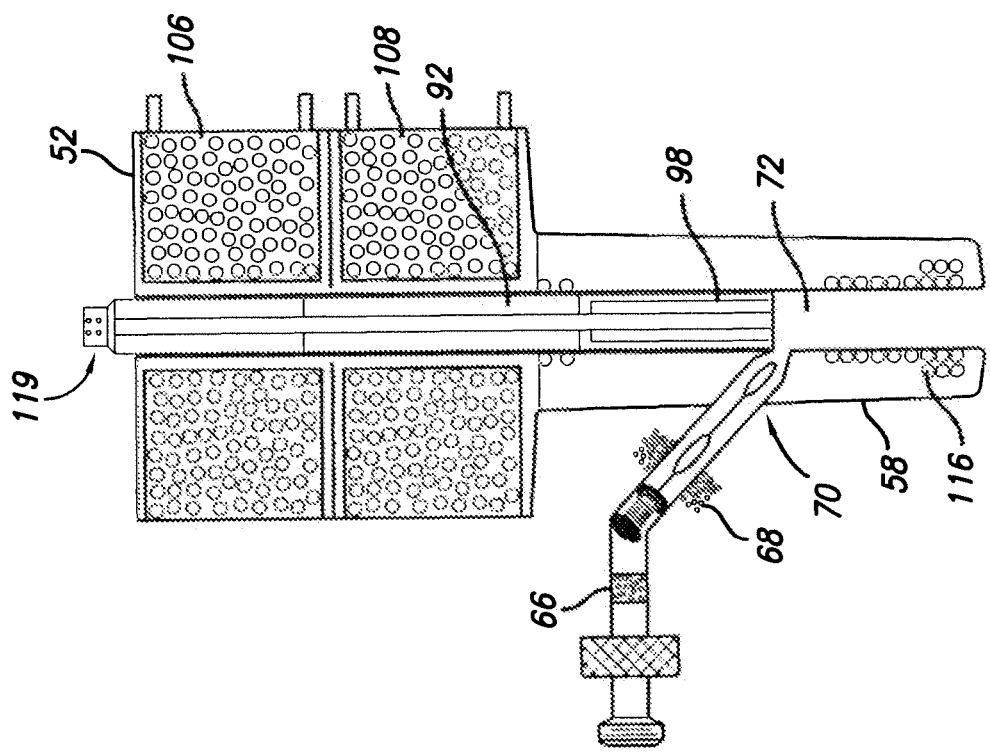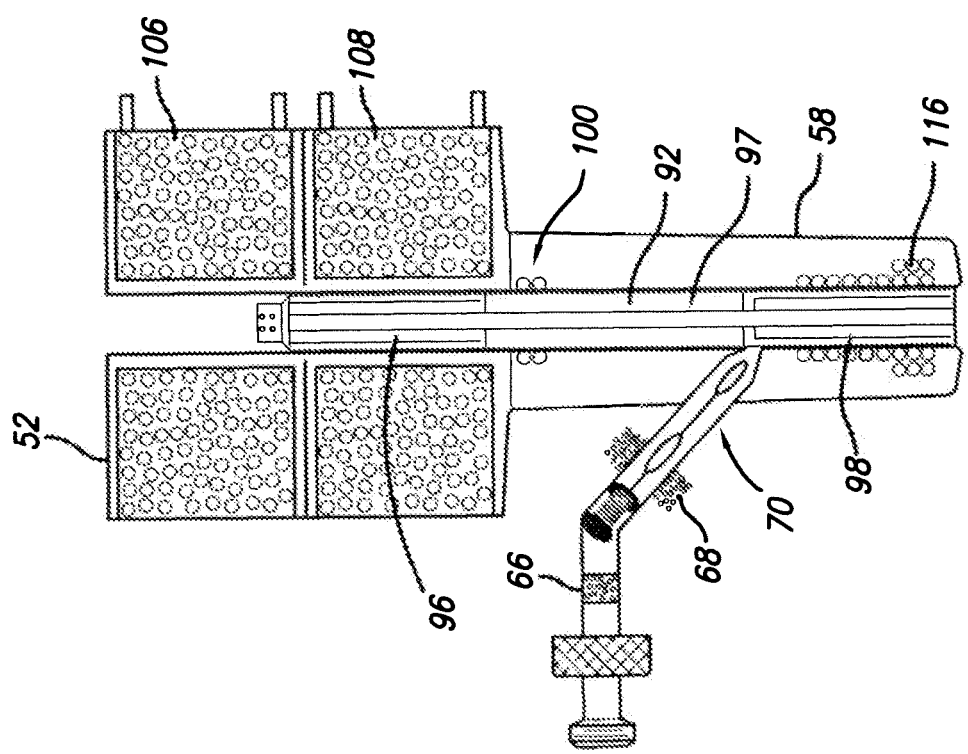

US 7,966,990 B2

INJECTOR-IGNITION FOR AN INTERNAL COMBUSTION ENGINE

REFERENCE TO RELATED APPLICATIONS

This application is a continuation of U.S. patent application Ser. No. 11/692,105 filed Mar. 27, 2007 now U.S. Pat. No. 7,546,826, which claims the benefit of U.S. Provisional Patent Application No. 60/787,964, filed Mar. 31, 2006, the content of which is incorporated herein by reference in its entirety.

FIELD OF THE INVENTION

The invention broadly relates to fuel injection systems and, more particularly, to an injector-ignition for an internal combustion engine.

BACKGROUND OF THE INVENTION

Much of the world's energy consumption is dedicated to powering internal combustion based vehicles. Most gasoline and diesel car engines are only 20-30% efficient, such that a major portion of the hydrocarbon fuels is wasted, thereby depleting global resources while producing an excessive quantity of pollutants and greenhouse gasses. As illustrated in FIG. 1 (prior art), about one third of the energy used by a conventional engine manifests itself as waste heat in the cooling system (coolant load 4) while another approximately one third of the energy goes out the tailpipe (exhaust enthalpy 2) leaving one third or less to provide useful work (brake power 6). At the internal level, these inefficiencies are due to the fact that the conventional combustion process inside a spark ignition gasoline engine or compression ignition diesel engine takes far too long as compared to the rotational dynamics of the piston and crank (i.e., the power stroke of the engine).

FIG. 2 (prior art) illustrates a typical heat release profile 7 within a high efficiency direct injection Euro-diesel engine cycle, including an ignition delay period 8, a premixed combustion phase 10, a mixing-controlled combustion phase 12 and a late combustion phase 14. Combustion before about 180° of cycle rotation (top dead center) results in increased wasted heat load, while a large portion of the energy from combustion in the late combustion phase 14 (after about 200°) is wasted as exhaust heat. In other words, heat release during the time period starting when the piston is at the top of its stroke and rotating down about 20 degrees (from 180° to 200°) provides the highest percentage of useful work. The heat release before top dead center causes pushback against the rotation which manifests itself ultimately as waste heat in the cooling jacket. Ignition must be started early in gas and diesel engines because it requires a substantial amount of time to fully develop as compared to the rotational timing of the engine. In the late combustion phase 14, fuel continues to burn past the useful limit of the power stroke, thus dumping waste heat into the exhaust system.

SUMMARY OF THE INVENTION

The present invention provides a heated catalyzed fuel injector for dispensing fuel predominately, or substantially exclusively, during the power stroke of an internal combustion engine. This injector lightly oxidizes the fuel in a super-critical vapor phase via externally applied heat from an electrical heater or other means. The injector may operate on a wide range of liquid fuels including gasoline, diesel, and various bio-fuels. In addition, the injector may fire at room pressure, and up to the practical compression limit of internal combustion engines. Since the injector may operate independent of spark ignition or compression ignition, its operation is referred to herein as "injection-ignition".

According to the invention, the fuel is catalyzed in the gas phase or super-critical phase only, using oxygen reduction catalysts. The injector greatly reduces both front end and back end heat losses within the engine. Ignition occurs in a fast burn zone at high fuel density such that a leading surface of the fuel is completely burned within several microseconds. In operation, the fuel injector precisely meters instantly igniting fuel at a predetermined crank angle for optimal power stroke production. More particularly, the fuel is metered into the fuel injector, such that the fuel injector heats, vaporizes, compresses and mildly oxidizes the fuel, and then dispenses the fuel as a relatively low pressure (e.g., 100 bar) gas column into a combustion chamber of the engine.

The internal combustion engine operates under the command of an engine control unit (ECU), which may control various aspects of engine operation such as (i) the quantity of fuel injected into each cylinder per engine cycle, (ii) the ignition timing, (iii) variable cam timing (VCT), (iv) various peripheral devices, and (v) other aspects of internal combustion engine operation. The ECU determines the quantity of fuel, ignition timing and other parameters by monitoring the engine through sensors including MAP sensors, throttle position sensors, air temperature sensors, engine coolant temperature sensors and other sensors.

The injector-ignition internal combustion engine includes a combustion chamber, wherein the fuel injector is mounted substantially in the center of the cylinder head of the combustion chamber. During operation, a fuel column of hot gas is injected into the combustion chamber, such that a leading surface of the fuel column auto-detonates and the fuel column is radially dispensed into a swirl pattern mixing with the intake air charge. The combustion chamber provides a lean burn environment, wherein 0.1% to 5% of the fuel is pre-oxidized in the fuel injector by employing high temperature and pressure. Pre-oxidation within the fuel injector may include the use of surface catalysts disposed on injector chamber walls and oxygen sources including standard oxygenating agents such as methyl tert-butyl ether (MTBE), ethanol, other octane and cetane boosters, and other fuel oxygenator agents. Pre-oxidation may further comprise a small amount of additional oxygen taken from air or from recirculated exhaust gas. The injector-ignition injector can fire at atmospheric pressure; however, in a preferred embodiment of the invention, the injector fires at high pressure.

This injector-ignition injector system heats liquid fuels well beyond their room pressure boiling point. However, like water, most hydrocarbon fuels and alcohols are subject to elevated boiling point with elevated pressure so that as a liquid is heated under pressure, it will stay in liquid form well above its atmospheric boiling point, and will re-condense to liquid phase if it is vaporized at low pressure and then rapidly pressurized. There is, however, a point of pressure and temperature at which it is no longer possible to maintain a liquid phase or re-compress to a liquid phase. This is commonly called the critical point and includes a critical temperature and a critical pressure. Above the critical temperature and pressure, it is no longer possible to form a liquid, so the molecules interact in the gas phase even though they may be compressed beyond the density of a corresponding liquid. As per the CRC Handbook 87th Edition, the critical temperature for heptane (a major component of gasoline) is 512° F. and the critical pressure is 397 psi.

The injector-ignition system of the invention utilizes oxygen reduction catalysts which work predominately in the vapor or super-critical fluid phase. The catalyst combines available oxygen in the range of 0.1% by weight to 5% by weight with one or more components within the fuel mixture to form highly reactive, partially oxidized radicals which will very rapidly continue to oxidize once exposed to the much richer oxygen environment of the main combustion chamber. The actual number of such active radicals required for very fast combustion (in the 100 microsecond range or less) is very small, and is largely dependent on the mean free path of the molecules and the reaction wavefront propagation delay within the main combustion chamber reaction zone. For example, at atmospheric pressure, and under the appropriate conditions of temperature and oxygen concentration, the combustion wavefront moves at approximately the speed of sound which, under typical circumstances, is about 1 foot per millisecond. Accordingly, targeting a main chamber combustion delay of 10 microseconds indicates that these free radicals need to be dispersed on the order of 0.1 inches apart or closer which, based on the very large number of molecules per cubic inch, requires an exceedingly small concentration of such radicals.

Likewise, each radical that is formed in the fuel injector utilizes chemical bond energy from the fuel such that the chemical bond energy in the main combustion chamber is reduced by that amount. It is therefore highly advantageous to minimize the number of free radicals formed to a level high enough to insure very high rate ignition, but low enough to minimize the degradation of the energy content of the injected fuel. In addition, most oxygen reduction catalysts also act as thermal cracking catalysts, particularly when heated to elevated temperatures in the 1,000° F. range and higher. Thermal cracking of the fuel in the injector is highly undesirable because it leads to carbon formation which initially fouls the catalytic surface and, if allowed to continue, actually impedes the flow of fuel through the injector. In addition, short chain cracked components typically have higher auto-ignition temperatures and higher heats of vaporization than octane and heptane, such that under commonly occurring laboratory conditions, excessively heating the injector will actually increase the ignition delay beyond the ideal situation as described above and also lead to rapid carbon formation.

In view of the above, the injector-ignition injectors described herein optimally utilize a highly dispersed (i.e., low concentration) oxygen reduction catalyst that has moderate activity at temperatures and pressures at which most of the fuel components are in the super-critical phase. Nickel has been found to be one such catalyst and operates in the range of 600-750° F. at 100 bar.

In accordance with the principles of the invention, the required heat input to the fuel may be minimized by carefully controlling the external source of heating in conjunction with the fuel flow rate and fuel catalyst contact surface area, to produce an appropriate number of radicals without allowing the catalyzed oxidation process to significantly contribute thermal energy to the reaction zone. Such additional thermal energy would rapidly lead to thermal runaway and potentially consume all available oxygen, thereby significantly reducing the energy content of the resultant fuel and promoting carbon formation. This is of particular concern since commercial fuels may contain 1% to 10% oxygenator agents.

According to the invention the fuel is pre-oxidized in the injector to provide relatively low temperature auto-ignition sites within the dispensed fuel column, which supports the initiation of surface auto-detonation and subsequent lean burn within a temperature and pressure range compatible with conventional automotive engine construction materials. The dispensed fuel column may contain 0.1% to 5% pre-combustion radicals in the form $RO_2\bullet$ and $ROOH\bullet$, which are highly reactive, partially oxidized, cracked hydrocarbon chains from the initial fuel. By way of example, the fuel injector may be mounted in place of a conventional direct diesel injector on an automotive diesel engine that operates at high compression ratios in the range of 16:1 to 25:1. The engine may employ compression heating by way of high compression ratios, and the fuel may comprise gasoline, diesel fuel, high cetane fuel, high octane fuel, heptane, ethanol, plant oil, biodiesel, alcohols, plant extracts, and combinations thereof.

According to further embodiments of the invention, the fuel injector may comprise a heated catalyzed fuel injector employed in a multi-fuel vehicle having a variable cycle engine, wherein the fuel is dispensed substantially exclusively during a power stroke of the variable cycle engine. Such a variable cycle engine may use spark and/or compression ignition, and may operate in air throttled and/or open throttled configurations. Additionally, the variable cycle engine may include an intermixed thermal energy recovery system for providing the injection of air, water, steam or other expandable media. The variable cycle engine may be adapted to operate with a wide range of fuels including conventional gasoline, diesel, biodiesel, alcohols, plant extracts, and mixtures of these fuels.

The injector-ignition engine may include a smart fueling system having an ECU having a wireless serial communications link for wireless communication with the fuel pump. In particular, the ECU communicates to the fuel pump a precise fuel mixture and amount of fuel in the tank, and in response, the fuel pump calculates appropriate refueling mixtures that are compatible with the remaining fuel in the tank and the vehicle's operational capabilities. The smart fueling system may be employed to offer customers one or more optimized fuel blends for refueling a multi-fuel vehicle. The ECU determines actual fuel performance during combustion using engine performance under load measurements, load sensors, and knock sensors. In addition, the ECU may be configured to maintain a log of all fuel loadings including a precise mixture of fuels, an amount pumped into the tank, fuel consumption, observed performance, and chronological climate conditions. The vehicle may be capable of dynamically adapting to various fuel mixtures under control of the ECU.

According to further embodiments of the invention, the fuel injector may comprise a heated catalyzed fuel injector employed in a vehicle having an injector engine that runs on a bio-renewable flex fuel, herein the fuel is dispensed substantially exclusively during a power stroke of the variable cycle engine. The vehicle preferably includes a tank for mixing high octane and high cetane fuels in predetermined ratios. Particularly, the flex fuel may comprise a mixture of plant extract oil and small quantities of gasoline and/or ethanol. For example, the plant extract oil may comprise soybean oil, canola oil, rapeseed oil, sunflower seed oil, or algae and plankton extractions. In some embodiments, the mixture comprises a zero net carbon flex fuel.

According to one embodiment, the mixture of plant extract oil and small quantities of gasoline and/or ethanol contains by weight, about 65% plant oil mixed with about 25% gasoline and about 10% ethanol. The fuel injector is configured to heat the fuel in a hot section and then inject the heated catalyzed fuel using a high pressure nozzle dispersal system at 100 bar or greater. The heated fuel injector directly accommodates the higher viscosity of the plant oils and also facilitates starting in cold environments. The bio-renewable flex fuel is preferably catalyzed in the gas phase or super-critical phase only, using oxygen reduction catalysts. Additionally, the injector-ignition engine preferably comprises a high compression engine.

BRIEF DESCRIPTION OF THE DRAWINGS

The FIG. 1 (prior art) is a schematic diagram that illustrates the inefficiencies in a conventional combustion process inside a spark ignition gasoline engine or a compression ignition diesel engine;

FIG. 8A is a sectional view of the preferred injector-ignition fuel injector of FIG. 6, wherein the ram is in a full displacement position, whereas FIG. 8B is a sectional view of the preferred injector-ignition fuel injector of FIG. 6, wherein the ram is in a fully retracted position for allowing liquid fuel to enter the pressurization chamber.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

In accordance with the principles of the present invention, a heated catalyzed fuel injector is provided for dispensing fuel substantially exclusively during the power stroke of an internal combustion engine, wherein the fuel is catalyzed in the gas phase or super-critical phase only, using oxygen reduction catalysts.

Detonation comprises an alternative form of combustion that provides an extremely fast burn and is commonly manifested as the familiar knock in mistuned car engines. Conventional internal combustion engines place their entire fuel load in the cylinder before ignition. Detonation causes a significant portion of the entire fuel load to ignite in a few microseconds, thus producing an excessive pressure rise which can damage engine parts. These conditions typically occur in an uncontrolled fashion in mistuned engines, causing the fuel to detonate at some time other than appropriate for power stroke production. In addition, this type of detonation is dependent on an ignition delay to compress the air supply and vaporize the fuel.

Figure 3:
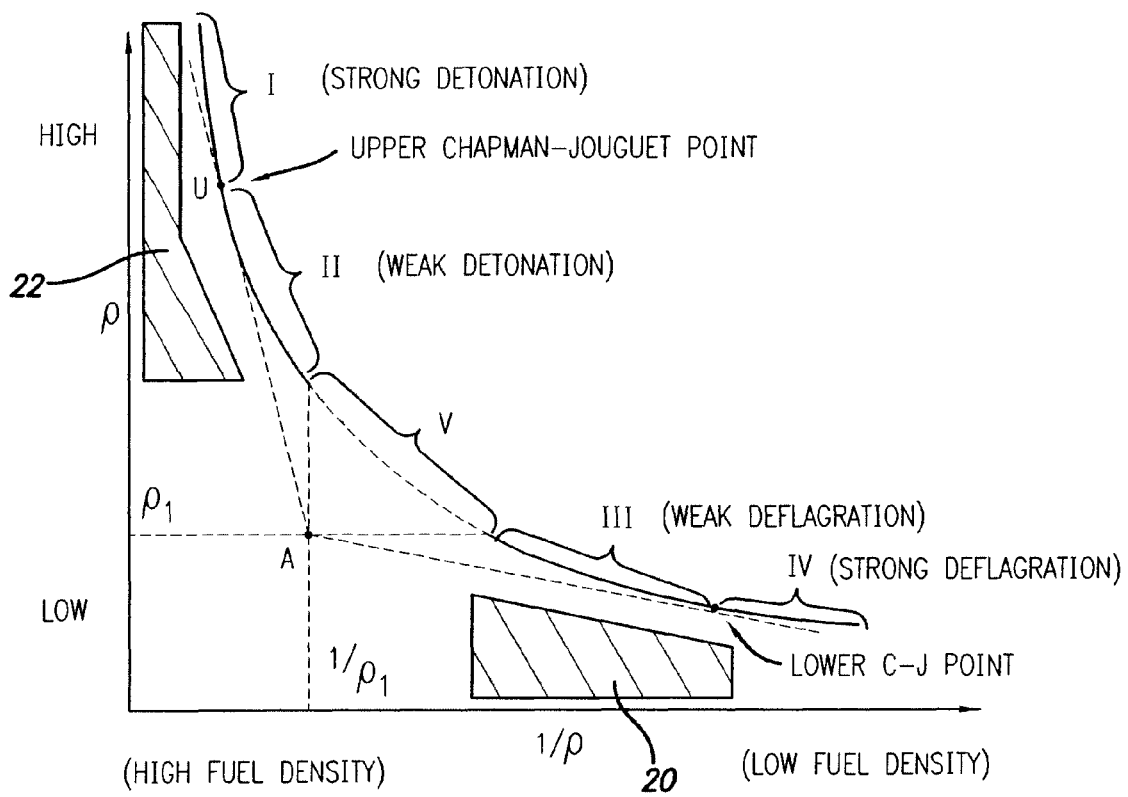
FIG. 3 is a schematic diagram that illustrates the difference between ignition in a conventional gas engine and ignition in an internal combustion engine having a fuel injector in accordance with the principles of the invention.

Referring to FIG. 3, a schematic diagram is provided that illustrates the difference between slow combustion in a conventional gas engine and fast combustion including detonation in an internal combustion engine having a heated catalyzed fuel injector in accordance with the principles of the invention. In particular, ignition in a conventional gas engine substantially occurs in a slow burn zone 20 at low fuel density. By contrast, in an internal combustion engine having a heated catalyzed fuel injector as described herein, ignition substantially occurs in a fast burn zone 22 at high fuel density. In the fast burn zone 22, a leading surface of the fuel charge is completely burned within a matter of microseconds. In the diagram, section I of the curve represents strong detonation, section II represents weak detonation, section III represents weak deflagration, and section IV represents strong deflagration. In addition, A represents the origin of the Hugoniot Curve.

Figure 1:
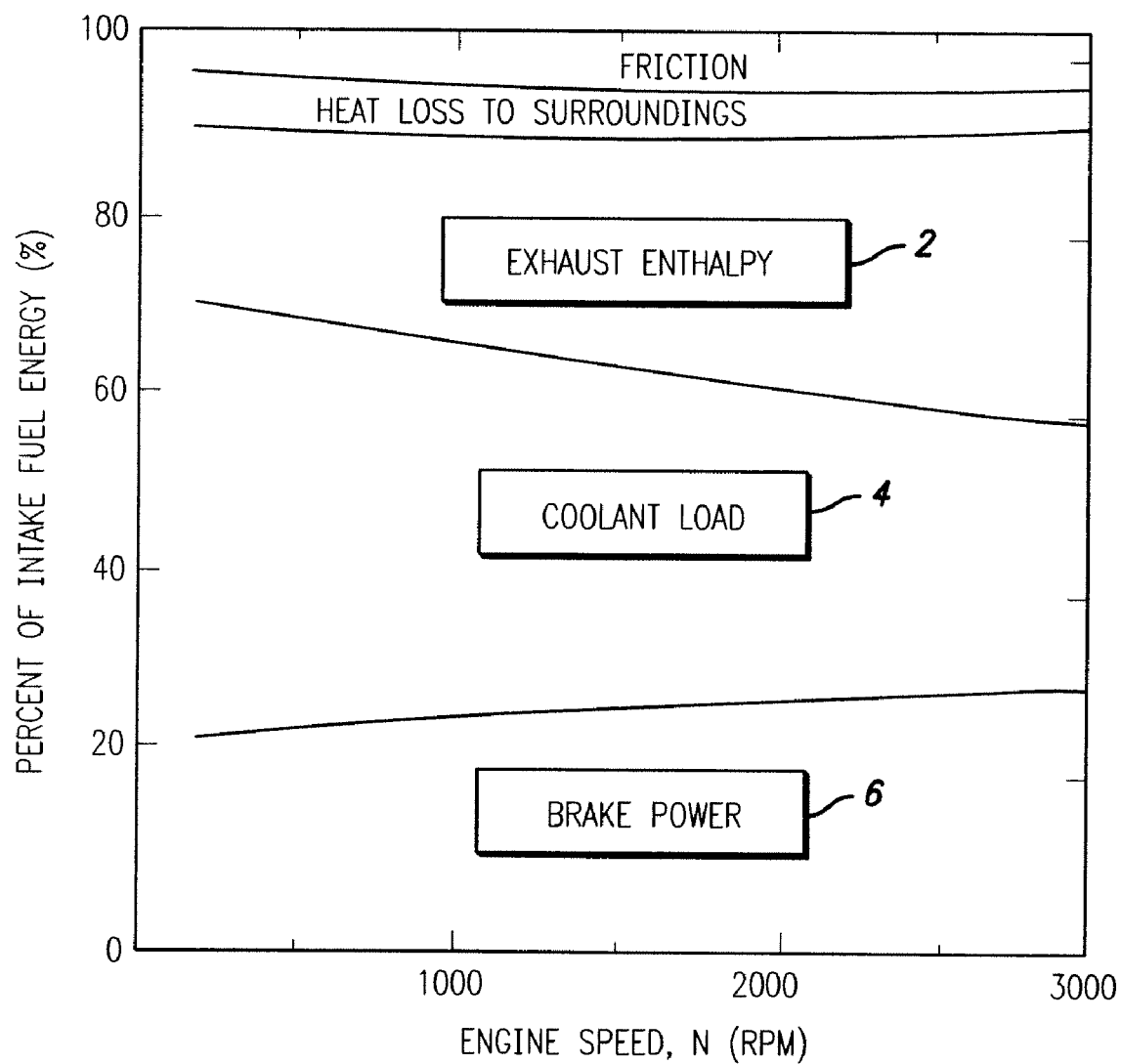
Figure 2:
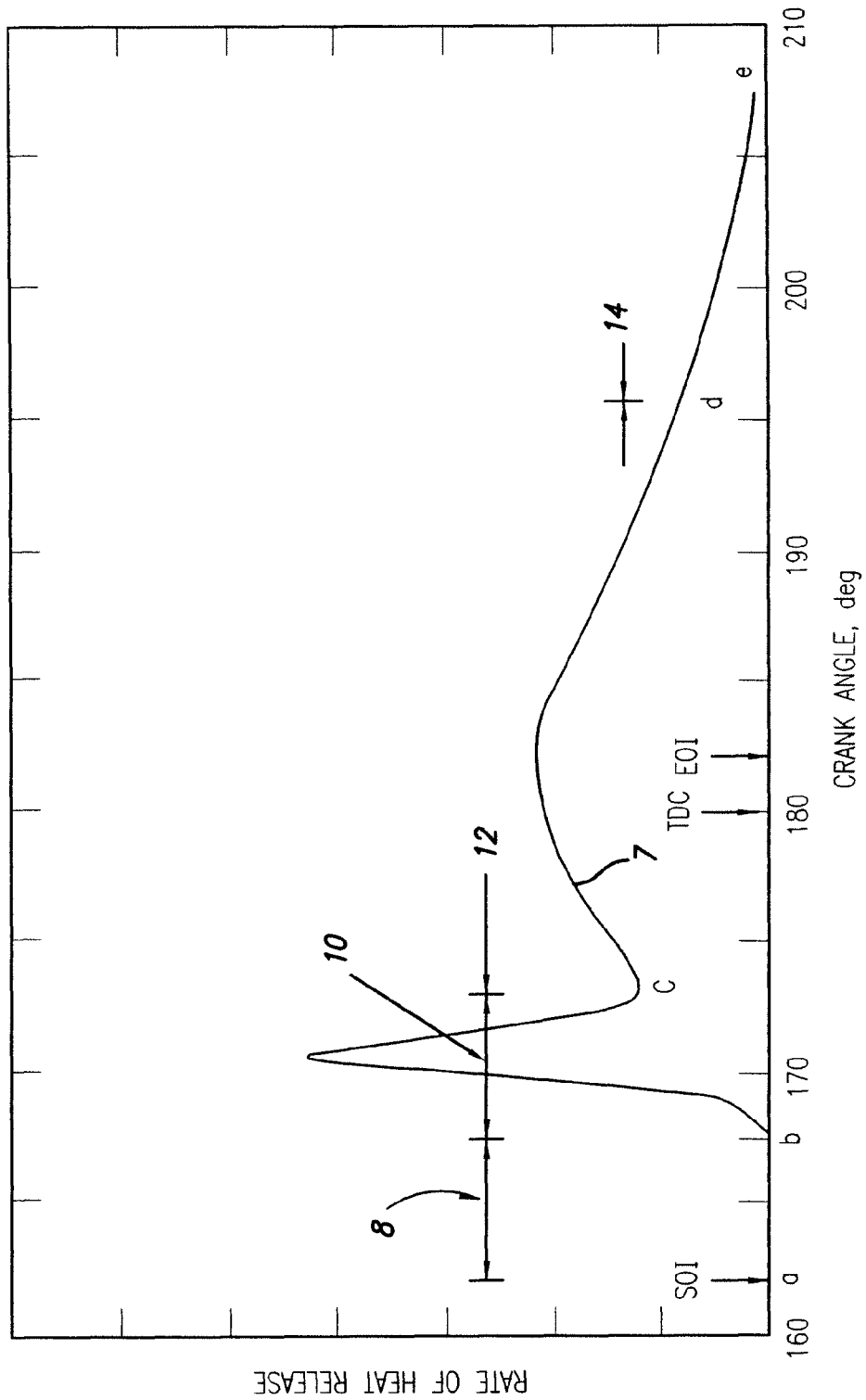
FIG. 2 (prior art) is a schematic diagram that illustrates a typical heat release profile within a high efficiency direct injection Euro-diesel engine cycle.
Figure 4:
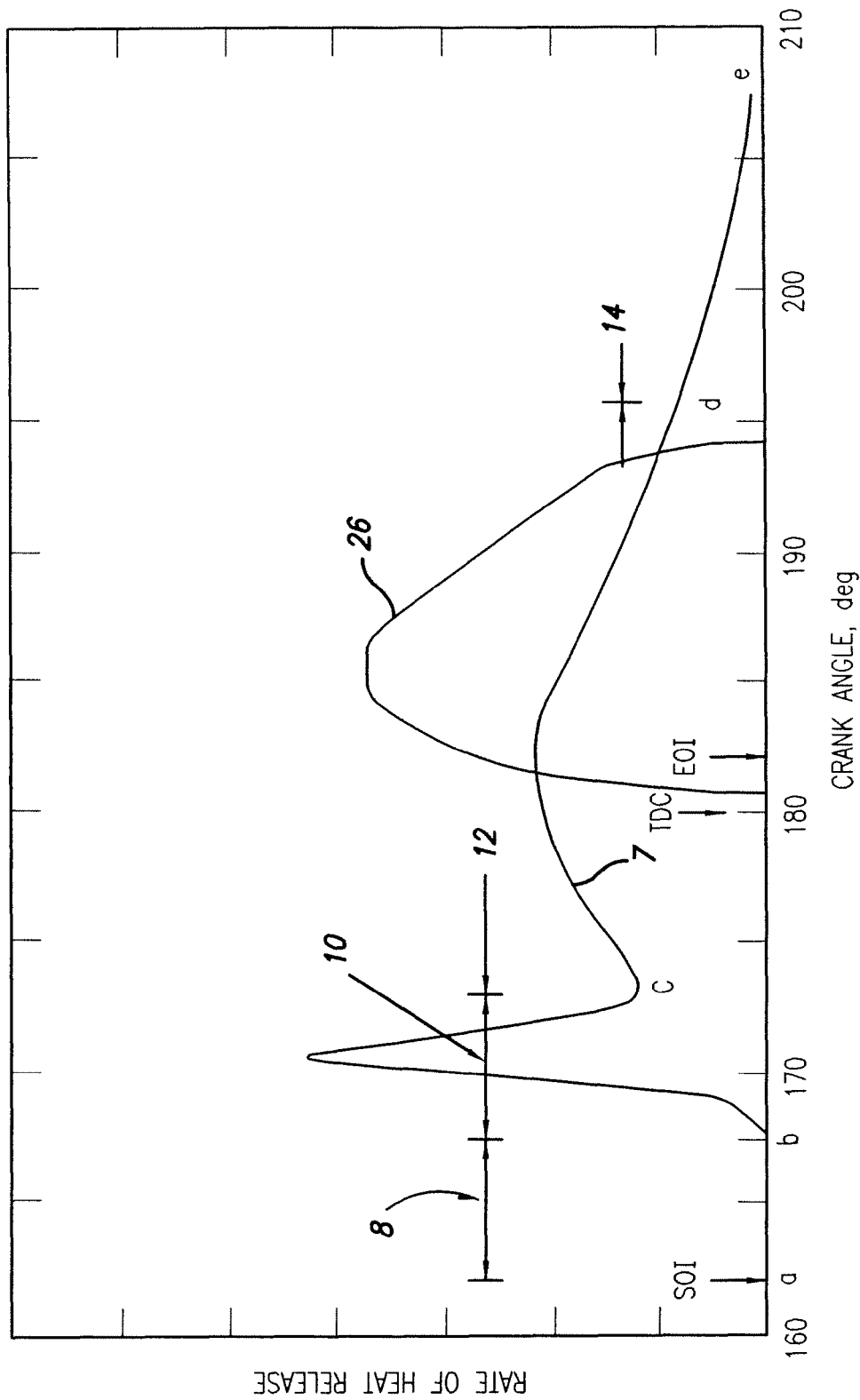
FIG. 4 is a schematic diagram illustrating a heat release profile for an internal combustion engine having a fuel injector in accordance with the principles of the invention.

Referring to FIG. 4, a schematic diagram is provided that illustrates a heat release profile 26 for an internal combustion engine having a fuel injector in accordance with the principles of the invention. Particularly, the heat release profile 26 is superimposed over the typical heat release profile 7 of the direct injection Euro-diesel engine cycle depicted in FIG. 2, the heat release profile 7 including an ignition delay period 8, a premixed combustion phase 10, a mixing-controlled combustion phase 12, and a late combustion phase 14. In contrast to the direct injection Euro-diesel engine, the fuel injector set forth herein (having heat release profile 26) precisely meters instantly igniting fuel at an appropriate crank angle for optimal power stroke production. Specifically, the fuel injector dispenses instantly burning fuel in a precise fashion substantially exclusively during the power stroke, thereby greatly reducing both front end (cooling load) and back end (exhaust enthalpy) heat losses within the engine. According to some embodiments of the invention, conventional low octane pump gasoline is metered into the fuel injector, wherein the fuel injector heats, vaporizes, compresses and mildly oxidizes the fuel charge, and then dispenses it as a relatively low pressure gas column into the center of the combustion chamber.

Figure 5A:
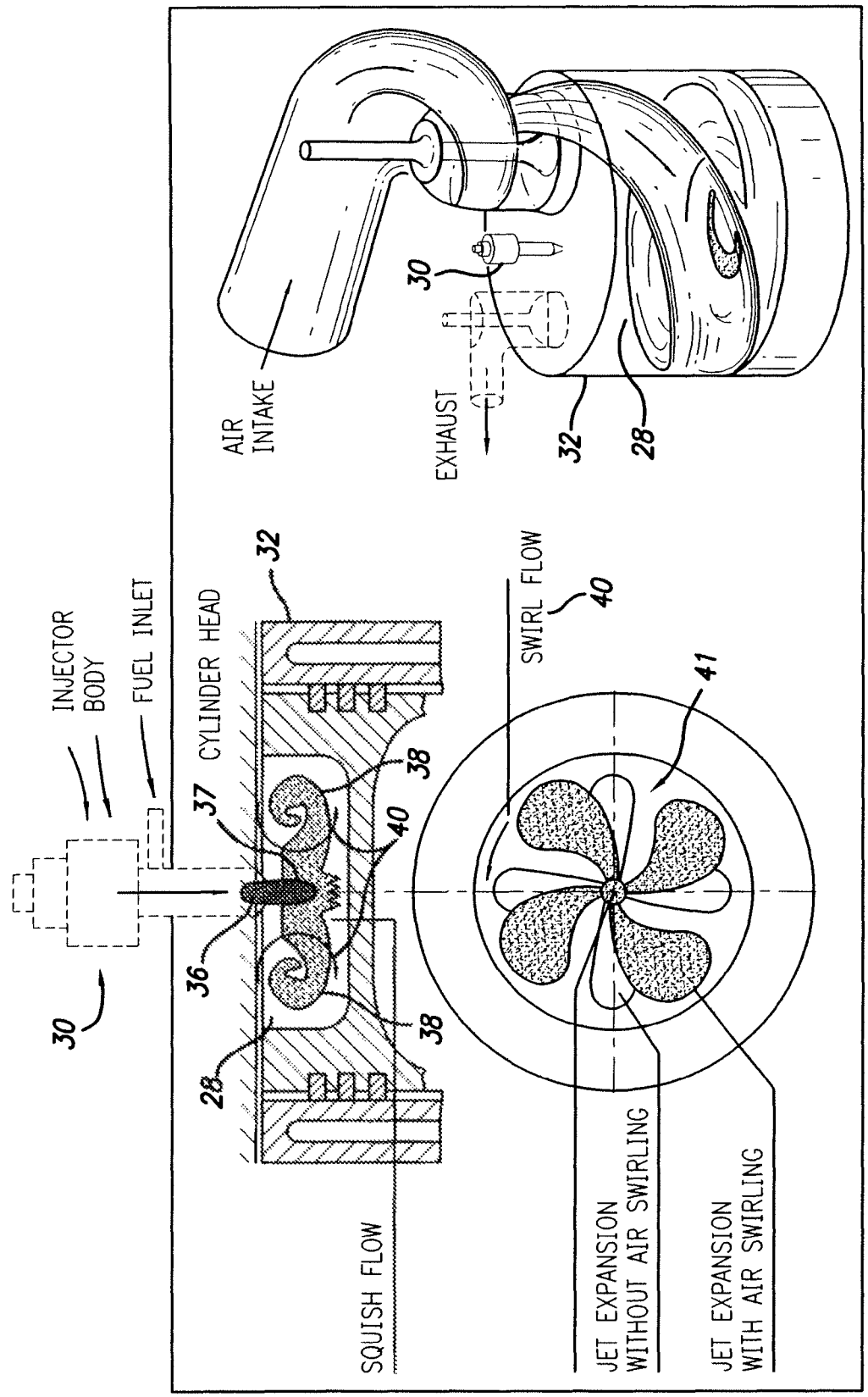
FIG. 5A depicts a combustion chamber for the internal combustion engine of the invention including a fuel injector mounted substantially in the center of the cylinder head.

Referring to FIG. 5A, a combustion chamber 28 for an internal combustion engine is illustrated comprising a conventional automotive diesel high swirl high compression combustion chamber. Particularly, the combustion chamber 28 includes a preferred heated catalyzed fuel injector 30 of the invention mounted substantially in the center of the cylinder head 32. As a fuel column 36 of hot gas is injected into the combustion chamber 28, its leading surface 37 auto-detonates, which radially dispenses the fuel column 36 into a swirl 38 pattern in a direction indicated by arrows 40. The leading surface 37 represents the detonation interface, while the swirl 38 represents dispersed gas and air yielding fast lean burn. Such a combustion chamber configuration provides a fairly conventional lean burn environment, wherein 0.1% to 5% of the fuel has been pre-oxidized in the fuel injector 30 by use of high temperature and pressure. The fan-shaped element 41 of FIG. 5A depicts the rotational movement of the radially expanding fuel charge it swirls within the combustion chamber 28. The fuel charge may expand symmetrically or may be comprised of one or more offset rows of jets, each row including a plurality of jets (e.g., four jets). As would be appreciated by those of skill in the art, any number of jets may be formed without departing from the scope of the invention.

With further reference to FIG. 5A, pre-oxidation within the heated catalyzed fuel injector 30 may involve surface catalysts on the injector chamber walls and oxygen sources including standard oxygenating agents such as MTBE, ethanol, other octane and cetane boosters, and other fuel oxygenator agents. Optionally, pre-oxidation may further involve a small amount of additional oxygen, e.g., from air or the last firing in the form of recirculated exhaust gas via an exhaust valve. This slightly oxidized fuel contains radicals in the form of $RO_2\bullet$ and $ROOH\bullet$, which are highly reactive, partially oxidized, cracked hydrocarbon chains from the initial fuel. Thus, the injected fuel provides relatively low temperature auto-ignition sites within the dispensed fuel column 36 which supports the initiation of surface auto-detonation and subsequent lean burn within a temperature and pressure range compatible with conventional automotive engine construction materials.

Figure 5B:
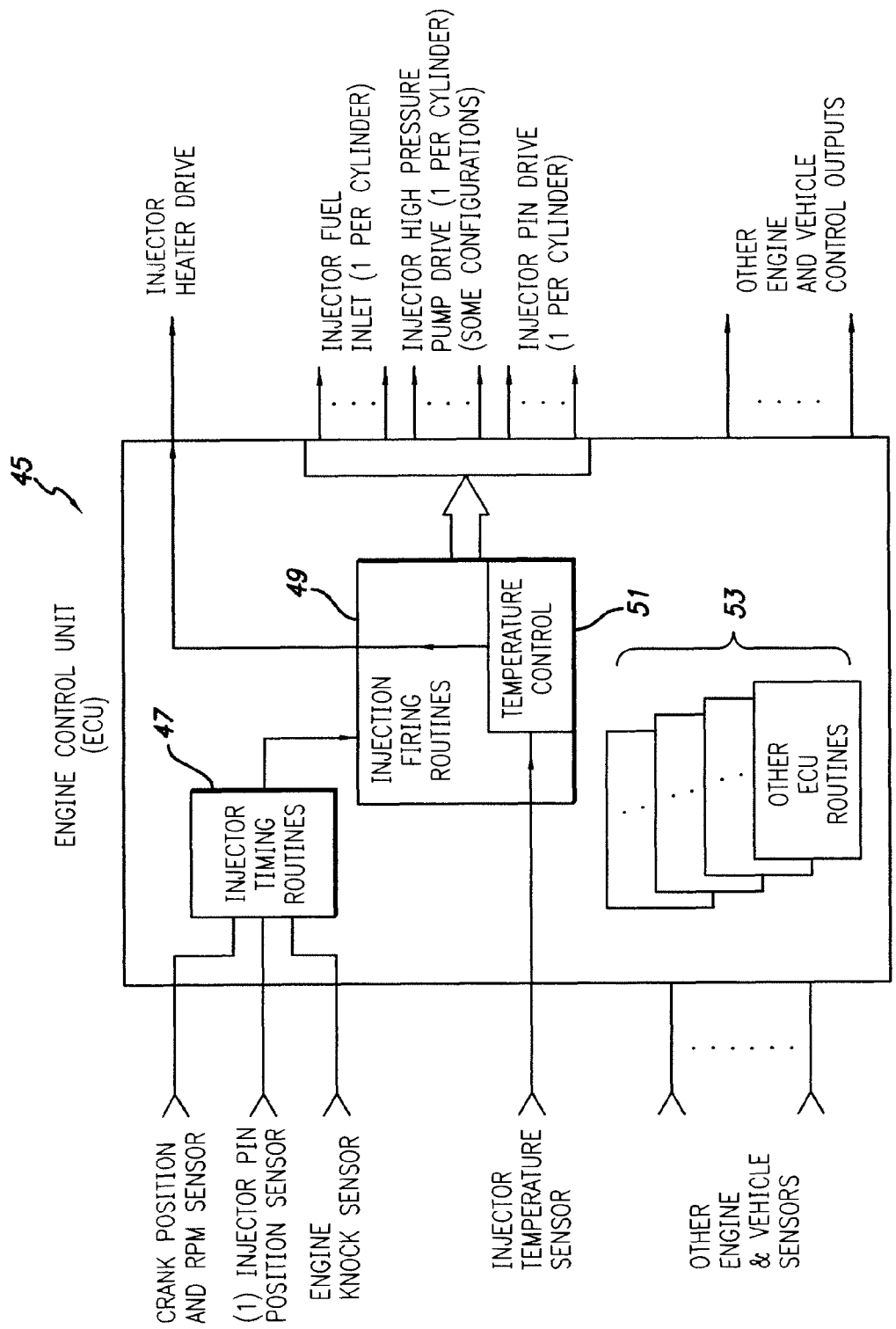
FIG. 5B is a schematic diagram illustrating an exemplary ECU for controlling fuel injection in accordance with the principles of the invention.

Referring to FIG. 5B, an exemplary ECU 45 for controlling fuel injection and other engine operations is illustrated. Specifically, the ECU 45 includes an injector timing routine 47 which determines when the injector will fire, an injection firing routine 49 which sequences the mechanical operation of the injector subsystems, a temperature control 51 for controlling an injector heating drive, and other ECU routines 53 controlling other engine and vehicle outputs. In operation, the injection timing routine 47 receives inputs from a crank position and RPM sensor, an injector pin position sensor, and an engine knock sensor. The injection timing routine 47 outputs the timing routine to the injection firing routine 49, which controls an injector fuel inlet (1 per cylinder), an injector high pressure pump drive (1 per cylinder in some configurations), and an injector pin drive (1 per cylinder). The injector firing routine 49 may further receive input from the ECU engine throttle routine and various other engine sensor routines as typically found on modern gasoline and diesel engines to adjust for changes in temperature, pressure, humidity, engine load, fuel quality, engine wear, and other variables. The temperature control 51 of the ECU 45 receives inputs from an injector temperature sensor and, in turn, controls the injector heating drive. The various other ECU routines 53 receive inputs from various other engine and vehicle sensors, such that the ECU routines 53 control various additional engine and vehicle outputs.

In some embodiments of the invention, the heated catalyzed fuel injector 30 may be employed in a hybrid or multi-fuel vehicle having a variable cycle engine featuring intermixed thermal energy recovery via the injection of air, water, steam or other expandable media. Such a heated injector is highly effective when firing into a highly cooled engine as per such thermal recovery techniques. The advanced variable cycle engine may be adapted to operate with a wide range of fuels including, but not limited to, conventional gasoline, diesel, ethanol, methanol, biodiesel, and plant extracts optionally including blended water content.

Figure 5C:
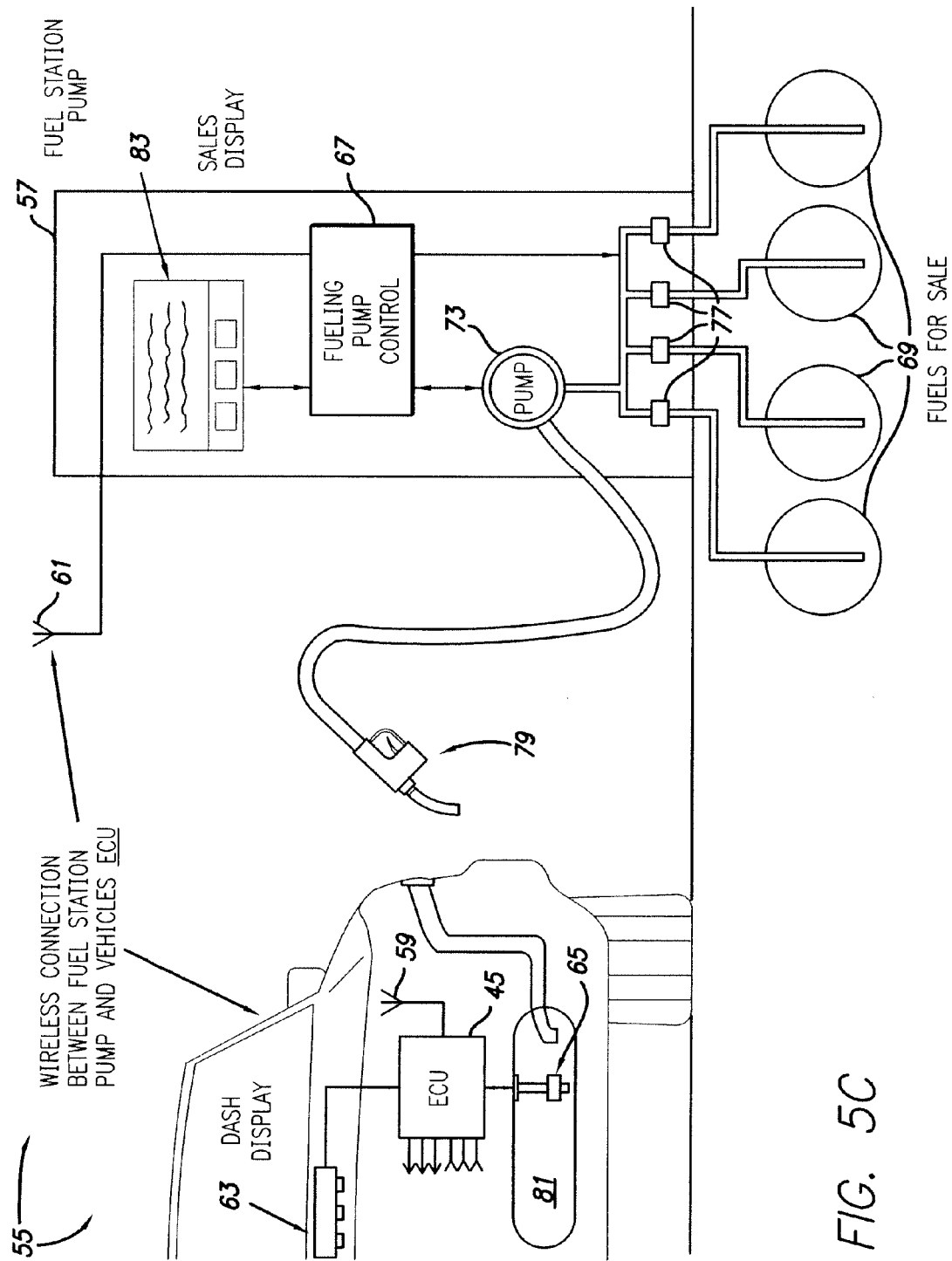
FIG. 5C is a schematic diagram illustrating wireless communication between the ECU of FIG. 5B and a conventional gasoline pump fuel nozzle.

Referring to FIG. 5C, further embodiments of the invention feature a smart fueling system 55 for a multi-fuel vehicle having an advanced variable cycle engine and an ECU (e.g., the ECU 45 of FIG. 5B) in communication with a conventional filling station fueling pump 57 by way of wireless serial communications links 59, 61 that may be co-located with the ECU 45 and the fueling pump 57, respectively. The system 55 is employed to offer customers one or more optimized fuel blends for refueling their multi-fuel vehicles. This information may be shown on an in-dash display 63 in communication with the ECU 45 as well as on the sales display 83 of the fuel station pump 57. The user may make a fuel selection based on buttons, touch sensitive areas or other conventional input means on display 83 and, optionally, on the in-dash display 63. Data exchange between the ECU 45 and the fueling pump 57 may be provided by any conventional wireless communication technology such as magnetic induction, optical communications, or low power RF. In operation, the ECU 45 communicates to the fueling pump 57 the precise fuel mixture and amount of fuel in the vehicle's tank 81, which is determined by way of a fuel tank sensor 65. In response, a fueling pump controller 67 calculates appropriate refueling mixtures that are compatible with the remaining fuel and the vehicle's operational capabilities, and offers the customer one or more refueling options based upon various fuels 69 (or mixtures thereof) that are for sale. Upon purchase the appropriate fuel or fuel mixture is pumped (via fuel pump 73) through pump valves 77 and injected into the tank 81 via fueling pump nozzle 79.

With further reference to FIG. 5C, the refueling options may be based upon selectable parameters including cost and performance, wherein the filling station fueling pump 57 blends and dispenses the fuel based upon the customer's selections. In the illustrated embodiment, the filling station fueling pump 57 includes a point of sale display 83 and an associated means for user input. The ECU 45 determines actual fuel performance during combustion using engine performance under load (engine RPM), load sensors and knock sensors. Additionally, the ECU 45 may be configured to maintain a log of all fuel loadings including the precise mixture of fuels and the amount pumped into the tank, fuel consumption, observed performance, and chronological climate conditions such as temperature, barometric pressure, altitude and humidity.

The advanced variable cycle engine may be adapted to operate with a wide range of fuels including, but not limited to, conventional gasoline, diesel, ethanol, methanol, other alcohols, biodiesel, and plant extracts optionally including blended water content. The vehicle may be equipped with a single fuel tank, or multiple fuel tanks for accommodating incompatible fuel blends. Purchasing decisions at the pump may be based upon multiple factors such as the most cost effective fuel supply available, the fuel mixture remaining in the fuel tank, and anticipated driving conditions including weather and altitude. The vehicle is capable of dynamically adapting to various fuel mixtures under control of the ECU.

According to further embodiments of the invention, the heated catalyzed fuel injector 30 may be utilized in an injector-ignition engine that runs on a bio-renewable flex fuel. By way of example, the flex fuel may comprise plant extract oil (e.g., soybean oil, canola oil, algae and plankton extractions) that is mixed with small quantities of gasoline and/or ethanol. The resultant mixture may comprise a zero net carbon bio-renewable flex fuel suitable for use with ultra-high compression engines equipped with heated, catalyzed direct-injectors. Such a zero net carbon fuel produces no net carbon in the Earth's biosphere when burned because the carbon present in the plant material is from captured carbon dioxide in the Earth's atmosphere as part of the normal photosynthesis process.

The plant extract oil may be obtained from plants that produce large quantities of extractable oil in relation to total mass. Suitable plant oils include, but are not limited to, sunflower seed oil, soybean oil, rapeseed (canola) oil, and various forms of algae and single cell organisms such as found in ocean plankton. Such plant extract oils may be extracted from the plant using a simple pressing operation. Although these oils have an energy content similar to diesel fuel, they have not been employed due to practical limitations such as a high cloud point (freezing point) and being vulnerable to bacteriological attack (by rotting under normal fuel handling conditions).

Ethanol is well known to depress the freezing point of water to temperatures suitable for use in conventional vehicles. Although ethanol can be derived from plant matter, it does not typically mix with common plant oils. According to the invention, raw plant oils are mixed with ethanol in conjunction with a small quantity of conventional gasoline (or other mixtures of linear hydrocarbons in the range of C5 to C10. By way of example, the mixture may contain 65% plant oil (by weight) mixed with 25% gasoline and 10% ethanol. The mixture is stable and does not separate into its various constituents under normal handling conditions. In addition, the mixture has a freezing point below 0° F. and is resistant to biological attack.

The fuel mixture described above is composed of high cetane plant oil which ignites well under the high compression of a diesel engine, as well as relatively high octane hydrocarbons (heptane) and ethanol, which perform well in low compression spark ignition engines, but do not typically perform well in compression ignition engines. For example, a high compression engine (e.g., 20 to 1) equipped with an injector that is both heated and contains oxygen reduction catalysts runs very effectively on the above-identified mixture. The heating directly accommodates the higher viscosity of the plant oils and also facilitates starting in cold environments. Additionally, the combination of heating and oxygen reduction catalysts attacks the oxygen bound in the ethanol to lightly oxidize the fuel mixture such that it burns very rapidly in the combustion chamber independent of the octane and cetane ratings of its components.

The above-described bio-renewable flex fuels are preferably catalyzed in the gas phase or super-critical phase only (as opposed to the liquid phase). In addition, the catalyzed smoldering fuel is preferably injected using a high pressure nozzle dispersal system at 100 bar or more, in contrast to conventional pre-chamber systems which rely on relatively slow and inefficient gas diffusion between the chambers or a low pressure intake manifold port valve.

In accordance with the principles of the invention, the in-cylinder dynamics of the combustion process within the combustion chamber 28 will now be described independently of the injector design details. Specifically, the combustion process initially involves the injection of a column 36 of relatively low pressure gas (e.g., 100 bar), which is heated well above its auto-ignition temperature (e.g., 750° F.). The column 36 may contain about 0.1% to 5% pre-combustion radicals in the form $RO_2\bullet$ and $ROOH\bullet$, which are highly reactive, partially oxidized, cracked hydrocarbon chains from the initial fuel. The column 36 of gas spontaneously auto-detonates in the combustion chamber 28 at the air-fuel interface when it is exposed to a heated air supply above the auto-ignition temperature. The detonation shock front, in conjunction with the ongoing dispenser drive, disperses the remaining incoming fuel over a much broader geometric volume.

Dispersing the remaining incoming fuel over a broader geometric volume within the combustion chamber 28 facilitates a slower continuous burn due to a greatly reduced fuel-to-air ratio. In addition, this yields a much higher rate of combustion than a conventional lean burn because of the high concentration of energized ignition sources from (i) the initial pre-oxidation of the fuel, and (ii) the remnants of the initial detonation front. Such a system may operate from atmospheric pressure to the practical limits of reciprocating engine compression, wherein a 20:1 compression ratio is preferred for optimal thermodynamic efficiency. The detonation induced fuel dispersal can be greatly enhanced by incorporation of a high swirl combustion geometry (e.g., as illustrated in FIG. 5) as commonly practiced in conventional light automotive diesels. The fuel system used in connection with the heated catalyzed fuel injector of the present invention may include a tank for mixing high octane and high cetane fuels in any appropriate ratio.

According to the invention, a heated catalyzed fuel injector 30 based on the technology described herein may be mounted in place of a conventional direct diesel injector on a small automotive diesel engine. The converted diesel engine may run on gasoline and operate at high compression ratios in the range of 16:1 to 25:1. To achieve the high compression ratios, the engine preferably employs compression heating rather than a conventional spark ignition. As would be appreciated by those of ordinary skill in the art, the fuel injector of the invention may be used with other fuels such as diesel fuel and various mixtures of high cetane fuels, high octane fuels, heptane, ethanol, plant oil, biodiesel, alcohols, and plant extracts, without departing from the scope of the invention. Nevertheless, operation using the much shorter hydrocarbon length gasoline is preferred in many applications over diesel fuel since it produces virtually no carbon particulate matter.

Figure 6:
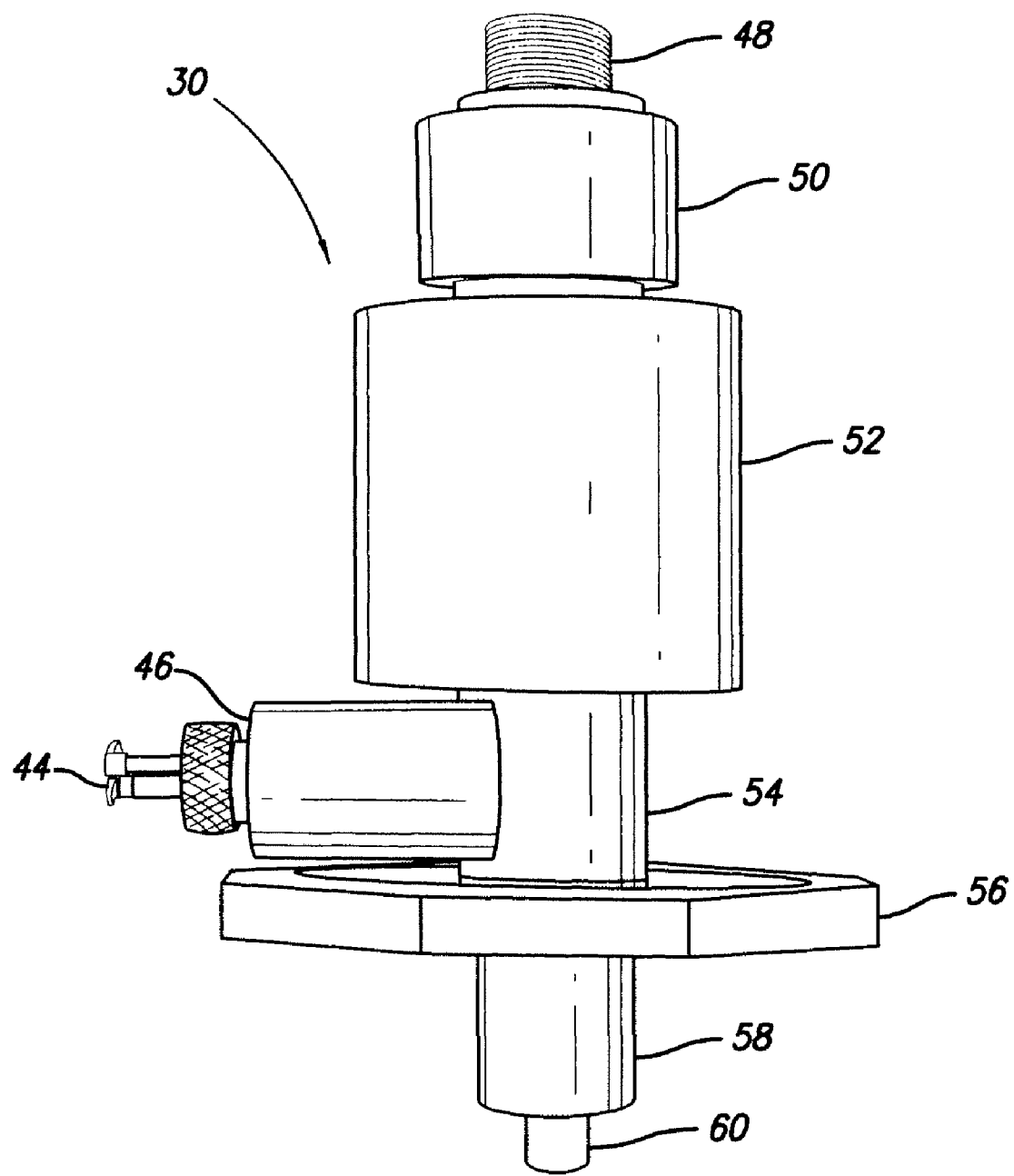
FIG. 6 depicts a preferred injector-ignition fuel injector constructed in accordance with the principles of the present invention.

Referring to FIG. 6, a preferred injector-ignition heated catalyzed fuel injector 30 of the invention comprises a heated catalyzed injector-ignition injector including a fuel input 44, an input fuel metering system 46, electrical connectors 48, a nozzle pin valve driver 50, a pressurization ram driver 52, an optional air inlet pinhole 54, a mounting flange 56, a hot section/pressurization ram 58 and an injector nozzle 60. The injector-ignition fuel injector 30 supports the vaporization, pressurization, activation and dispensing of fuel in a real world maintenance free environment. A characteristic operating pressure for the injector-ignition fuel injector 30 of the invention is approximately 100 bar dispensing into a 20:1 compression ratio engine (20 bar) with a fuel load which produces a 40 bar peak. In a preferred implementation, the fuel injector 30 features an internal nickel molybdenum catalyst which may be activated by operating the injector body at a temperature of approximately 750° F. Of course, as would be appreciated by those of ordinary skill in the art, other catalysts and injector operating temperatures may be employed without departing from the scope of the invention.

Figure 7:
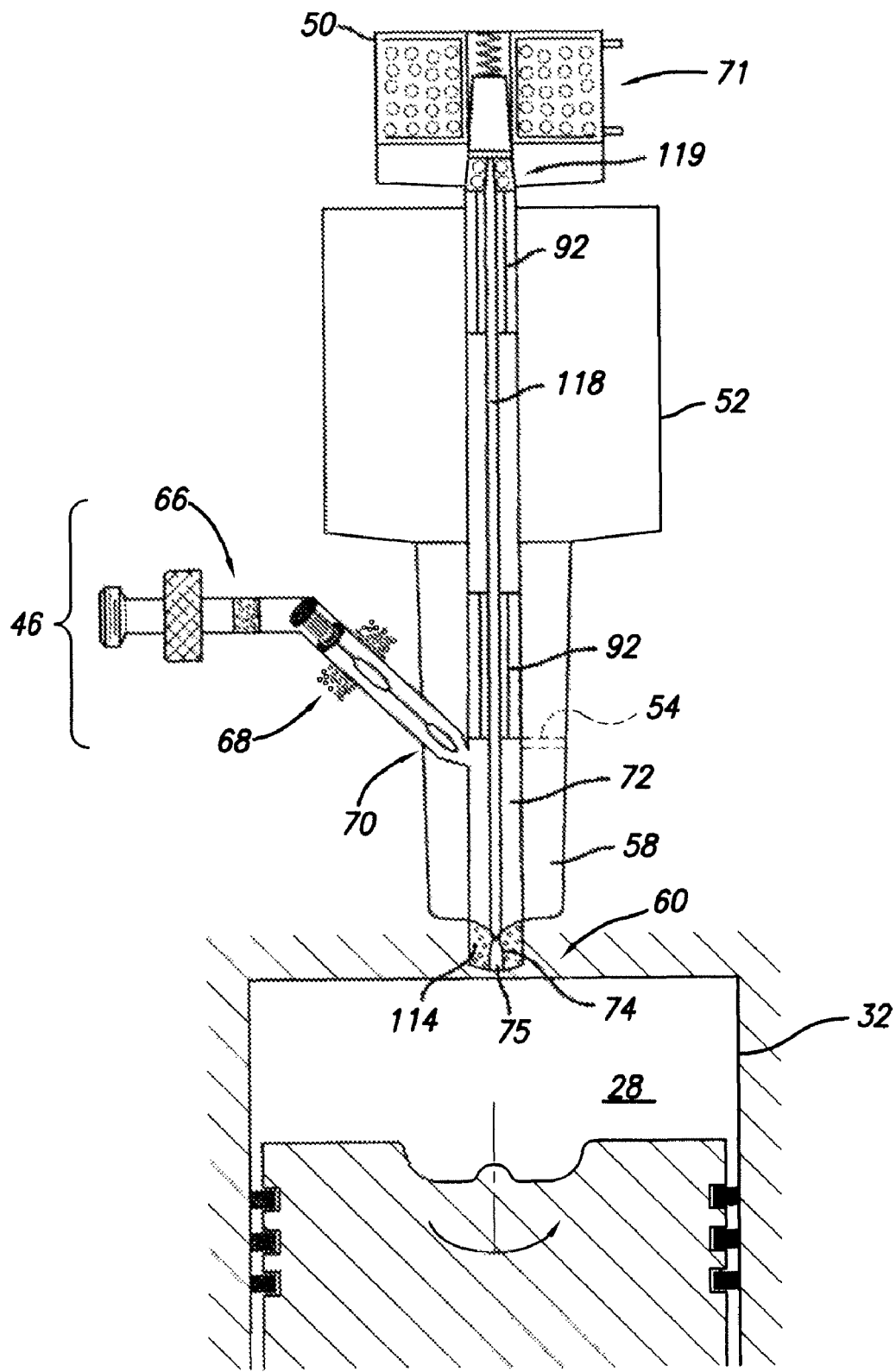
FIG. 7 is a sectional view of the preferred injector-ignition fuel injector of FIG. 6 showing the fuel inlet and outlet subsystems.

Referring to FIG. 7, the input fuel metering system 46 of the heated catalyzed injector-ignition fuel injector 30 of the invention will now be described. Specifically, the input fuel metering system 46 includes an inline fuel filter 66, a metering solenoid 68 and a liquid fuel needle valve 70. The liquid fuel needle valve 70 preferably comprises an electromagnetically or piezoelectric activated needle valve that dispenses the next fuel charge into a pressurizing chamber 72 in response to a look ahead computer control algorithm in the engine control unit (ECU). The liquid fuel needle valve 70 may accept fuel from a standard gasoline fuel pump or common rail distribution system.

With further reference to FIG. 7, the injector nozzle 60 of the fuel injector 30 is disposed between the pressurization chamber 72 and the combustion chamber 28 of the vehicle. The fuel charge dispensed by the input fuel metering system 46 is roasted in the pressurization chamber 72 via a hot section 58 of the fuel injector 30 surrounding the chamber 72. More particularly, the fuel charge is heated in the pressurization chamber 72 under pressure and in the presence of catalysts, which begin to crack the fuel and cause it to react with internal sources of oxygen. The injector nozzle 60 comprises an injector nozzle pin valve 74, a collimator 75, and a pin valve actuator 71. Specifically, the nozzle pin valve 74 opens at approximately top dead center (180° of cycle rotation), allowing the hot pressurized gas into the combustion chamber 28. The pin valve actuator 71 may comprise a pin valve solenoid which operates a pin valve drive shaft 118 for injecting the next fuel charge through the injector nozzle pin valve 74.

In the illustrated fuel injector embodiment, the pin valve drive shaft 118 is located inside the bore of the pressurization ram 92 such that it may slide coaxially within the pressurization ram 92. However, the pin valve drive shaft 118 operates independently of the pressurization ram 92. An 0-ring seal 119 on the top of the pressurization ram 92 blocks the leakage path between these two shafts. The geometry of the injector nozzle 60 varies substantially from a typical liquid fuel injector nozzle in that the injector nozzle 60 includes the pin valve 74 and a collimator 75 for collimating the heated fuel and dispensing a collimated, relatively low pressure charge of hot gas into the cylinder. Specifically, the injector nozzle 60 of the fuel injector 30 is electrically heated, for example using a conventional nichrome heating element 114 that lines the injector nozzle 60.

The pin valve actuator 71 of the injector nozzle 60 may comprise a rapid response electromagnetic drive or a piezoelectric drive. In its simplest form, the injector nozzle pin valve 74 opens to 100% as the pressurization ram 92 pushes the entire column of hot gas from the pressurizing chamber 72 into the combustion chamber 28 to full displacement of the injector volume. As would be understood by one of ordinary skill in the art, many combinations of pin valve and ram drive modulation may be employed with analog drive signals and/or digital pulse signals to produce various heat release profiles under different throttle and load situations, without departing from the scope of the present invention.

Referring to FIGS. 8A and 8B, another component of the all-in-one injector-ignition fuel injector 30 comprises a pressurization ram system comprising the pressurization ram 92, the pressurization ram driver 52 and the hot section 58 of the fuel injector 30 for heating the next fuel charge in the pressurization chamber 72 prior to injection. In particular, FIG. 8A depicts a first configuration of the pressurization ram system, wherein the pressurization ram 92 is in a full displacement position.

FIG. 8B depicts a second configuration of the pressurization ram system, wherein the pressurization ram 92 is in a fully retracted position for allowing liquid fuel to enter the pressurization chamber 72. The pressurization ram 92 compresses the fuel as it transitions from a liquid to a gas, and then to its critical point and beyond, where it becomes a very dense vapor. The pressurization ram 92 comprises a magnetically active portion 96 disposed substantially within the pressurization ram driver 52, an insulating portion 97 and a hot section compatible portion 98 which is disposed substantially within the hot section 58 when the pressurization ram 92 is in the full displacement position. The rest position for the pressurization ram 92 is at full displacement as illustrated in FIG. 8A. The pressurization ram 92 may further comprise one or more of O-ring seals 100 for preventing fluid leakage.

With continued reference to FIG. 8B, when the pressurization ram 92 is retracted, it may form a partial vacuum or a reduced pressure in the pressurization chamber 72, thus allowing the input fuel metering system 46 to inject the next charge as a relatively cool liquid. The pressurization ram 92 has a relatively long stroke and may incorporate a heat shield region for protecting the input fuel metering system 46 from the high temperatures near the hot section 58. A multiple winding solenoid coil system 106, 108 disposed within the pressurization ram driver 52 includes a retraction solenoid 106 and a pressurization solenoid 108. The multiple winding solenoid coil system 106, 108 may be replaced by a linear stepping motor that is used to drive the pressurization ram 92.

The fuel injector 30 of the invention is inherently safe in that it only requires a single firing of fuel above the auto-ignition temperature, which may be contained in a robust metal housing directly connected to the engine cylinder (where combustion normally occurs). In this manner, the hot section 58 of the fuel injector 30 can be considered as a mere extension of the existing engine combustion chamber 28. By way of example, the hot section 58 of the fuel injector 30 may be electrically heated via a conventional nichrome heating element 116 which lines the hot section 58.

Under electronic control of the ECU, a sufficient magnetic field is applied to pressurize the fuel load to a predetermined level commensurate with the next firing, as specified by the operator's throttle position. The fuel charge is roasted in the pressurization chamber 72 (via hot section 58) under pressure in the presence of catalysts, which begin to crack the fuel and cause it to react with internal sources of oxygen. Such internal oxygen sources are present in conventional pump gas via included anti-knock agents and winter oxygenators such as MTBE and/or ethanol. Diesel fuels also commonly include oxygen sources in the form of cetane boosters. According to the invention, hot section catalysts may include without limitation: (1) nickel; (2) nickel-molybdenum; (3) alpha alumina; (4) aluminum silicon dioxide; (5) other air electrode oxygen reduction catalysts (e.g., as used in fuel cell cathodes and metal air battery cathodes); and (6) other catalysts used for hydrocarbon cracking.

According to a preferred implementation, the operating temperature of the hot section 58 is approximately 750° F., which substantially minimizes the corrosion and heat-related strength loss of common structural materials such as 316 stainless steel and oil hardened tool steel. In contrast, typical compression ignition operating temperatures are above 1000° F. The hot section 58 may further comprise a nichrome heating wire. According to additional embodiments, oxygen may be pumped into the hot section 58 of the fuel injector 30.

Referring again to FIG. 7, the injector-ignition fuel injector 30 may pull in hot exhaust gas during the exhaust cycle of the engine by opening the injector nozzle pin valve 74 and retracting the pressurization ram 92. Under normal circumstances, the hot exhaust gas will still have un-reacted oxygen, which can be optionally used in conjunction with the fuel's internal oxygenation agents to lightly oxidize the fuel. Additionally, the fuel injector 30 may be configured to include an air inlet pinhole 54 in communication with the pressurization chamber 72 such that additional oxygen in the form of fresh air can be added to the hot section 58 when the pressurization ram 92 is disposed in the fully retracted position. The air inlet pinhole 54 may be equipped with a one way valve such as a ball valve (not shown) to preclude fuel vapor leakage during the pressurization stroke. Additionally, various other forms of air may be employed such as exhaust gas.

According to some embodiments of the invention, the heated catalyzed fuel injector 30 is inherently self-purging and self-cleaning. Specifically, the pressurizing ram 92 and the nozzle pin valve drive shaft 118 can be exercised repeatedly during engine starting operations, thereby (i) allowing air and moisture from long term engine stand to be purged on start, and (ii) allowing any carbon build up to be flushed through the relatively large injector nozzle 60. Unlike conventional fuel injectors, the pressurizing ram 92 moves over a relatively long stroke distance (0.25 inches or more) and can eliminate any void volume in the nozzle area 74 in its fully extended position.

In a preferred embodiment of the invention, the ECU may control one or more heated catalyzed injector-ignition fuel injectors 30 of the invention using a one firing cycle look-ahead algorithm for injector-ignition operation. The look-ahead algorithm for controlling injector-ignition timing may be implemented using a computer software program residing on the ECU, the software program comprising machine readable or interpretable instructions for controlling fuel injection. According to the look-ahead algorithm, preparation for the next engine firing starts immediately upon completion of the last engine firing. At this time, the fuel injector 30 is substantially empty of fuel, the pressurization ram 92 is in the full displacement position, the injector nozzle pin valve 74 is closed, and the hot section 58 is substantially at its operating temperature. In the simplest form of control, the ECU compares the throttle input to prior settings such as last throttle input, engine load, RPM, air inlet temperature, and other settings and electronic fuel controls. Using this information, the ECU determines the fuel load and the estimated time to the next firing.

The next firing cycle commences after an appropriate delay to minimize the fuel hold time in the hot section 58, thus minimizing excessive cracking of the fuel. Initially, the next firing cycle involves retracting the pressurization ram 92, which allows the input fuel metering system 46 to dispense an aerosol of liquid fuel into the hot section 58. The pressurization ram 92 then pressurizes the fuel in a two step cycle, including (i) protecting the input liquid fuel injector 30 while the fuel is heating and vaporizing, and (ii) pressurizing the fuel to the target injection pressure and temperature. In the second step, the fuel is vaporized to reach the target injection pressure and temperature.

After a pre-determined hold time, the injector nozzle pin valve 74 opens and the pressurization ram 92 pushes the fuel vapor column into the combustion chamber 28, such that the pressurization ram 92 reaches the full displacement position illustrated in FIG. 8A. In some embodiments, the pre-determined hold time may be back projected from the next top dead center event. The injector nozzle pin valve 74 then closes and the heated catalyzed fuel injector 30 is now ready for a next firing command. A wide range of variants with respect to the fuel injector cycle (e.g., interactive operation of the pressurization ram 92 and the injector nozzle pin valve 74 to tailor specific heat release profiles) are possible without departing from the scope of the invention. Since the main portion of the power stroke is merely a 30° rotation of a 720° four stroke cycle, the actual injection takes only approximately 4% of the available operating time.

With reference to FIG. 7, the energy required to operate the injector nozzle 60 may theoretically be as little as two percent of the energy content of the drive fuel; however, practical engine design considerations such as size constraints on high temperature insulation could cause the heating requirements to rise to several percent of shaft output power if driven solely by electrical system power. Since the fuel injector 30 is immediately next to one or more engine exhaust ports during operation, a very effective source of waste heat is readily available. The heated catalyzed fuel injector 30 of the invention may be housed directly in an exhaust port of a multi-valve engine where the flow through the exhaust valve may be selectively controlled. In addition, various active and/or passive heat pipe geometries that bring in heat from the exhaust zone may be utilized to reduce the electrical input to the heater.

Various automobiles may use three or more types of injectors in their direct injection gasoline power plant, including: (1) throttle body injectors for idling; (2) common rail intake port injectors for low speed operation; and (3) direct injectors for high speed operation. Likewise, the fuel injector 30 described herein may be used alone or in a wide range of combinations with throttle body and common rail injectors, with or without selectively operated spark ignition sources. Additionally, the heated catalyzed fuel injector 30 may operate in a pure vapor mode or may dispense a mixture of vapor and liquid. In applications where high RPM and high loading are infrequent (e.g., for a typical economy car), it may be desirable to use a fuel injector with a relatively low thermal heating capability, such that pure vapor operation is limited to vehicle cruise operation, for example under about 3600 RPM. Such a fuel injector progressively passes more liquid above a predetermined throttle load setting, resulting in progressively lower efficiency operation but at much higher power levels than the pure vapor design point.

Figure 9:
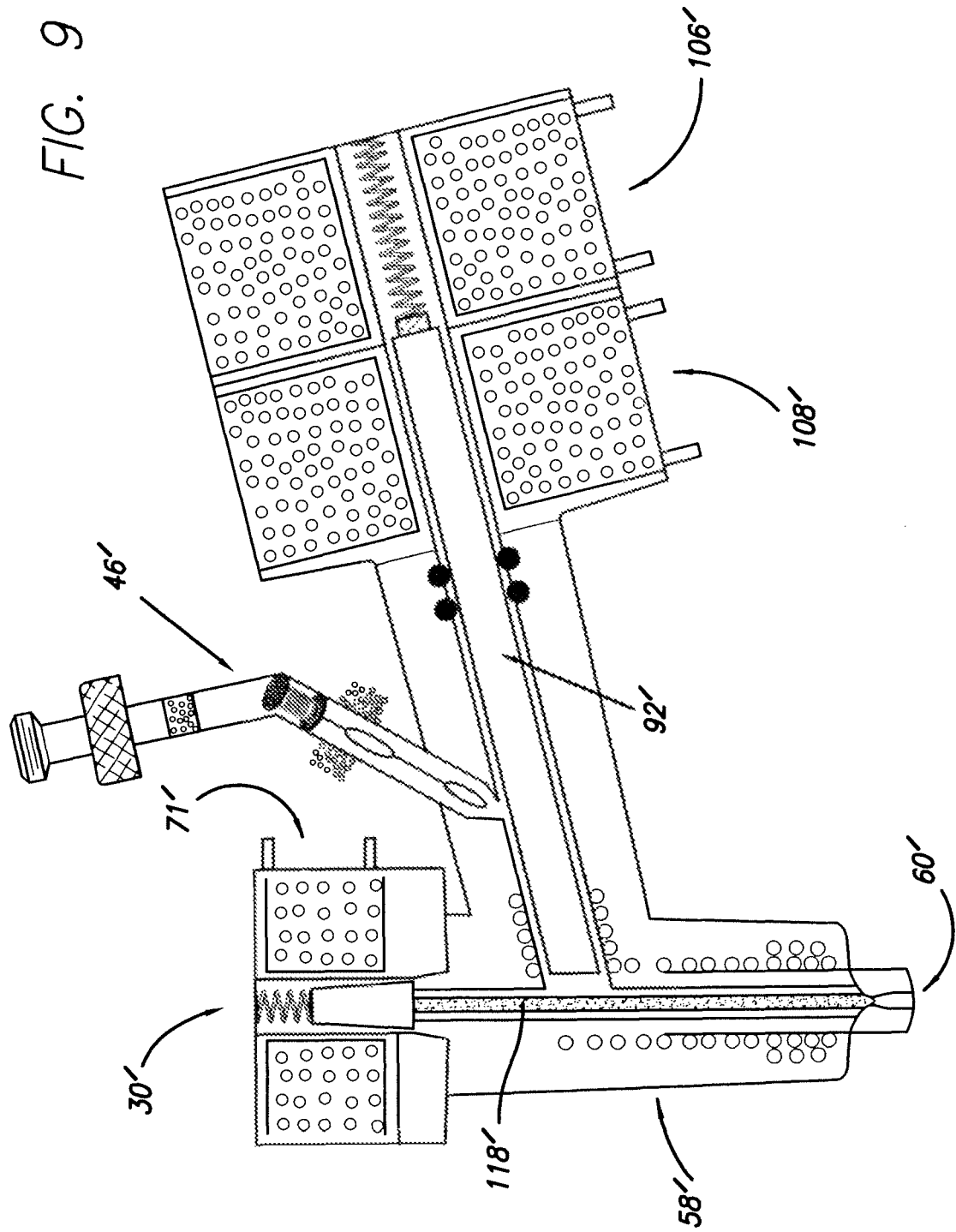
FIG. 9 is a sectional view of an alternative fuel injector of the invention comprising a linear fuel injector.

Referring to FIG. 9, in accordance with an alternative embodiment of the invention, the all-in-one fuel injector geometry described above is unfolded into a heated catalyzed linear fuel injector 30' comprising a liquid fuel metering system 46', a retraction solenoid 106', a pressurization solenoid 108', pressurization ram 92', an injector nozzle 60', a pin valve drive solenoid 71', a nozzle pin valve drive shaft 118' and a hot section 58'. This fuel injector configuration simplifies the rather complex and precise requirements of the coaxial placement of the pin valve drive shaft 118' inside the pressurization ram 92'. In other words, the pin valve drive shaft 118' is not disposed within the pressurization ram 92' and does not slide coaxially within the pin valve drive shaft 118'. Instead the pressurization ram 92' is disposed at an angle with respect to the pin valve drive shaft 118' as depicted in FIG. 9. It is noted, however, that this linear configuration reduces the self-purging and self-cleaning effectiveness of the all-in-one geometry in that the pressurization ram 92' is now off to one side and can no longer clean and purge the void volume around the injector nozzle 60'. This configuration utilizes the same ECU timing as the all-in-one injector depicted in FIGS. 7 and 8. In operation, a fuel charge dispensed by the input fuel metering system 46' is roasted via hot section 58' under pressure and in the presence of catalysts, which begin to crack the fuel and cause it to react with internal sources of oxygen. At approximately top dead center, the pin valve drive shaft 118' injects the hot pressurized gas into the combustion chamber via the injector nozzle 60'.

Both the all-in-one fuel injector 30 and the linear injector 30' may be operated at higher RPM and smaller physical size by replacing the liquid based input fuel metering system with a medium pressure, medium temperature feed system. This system, which may be shared among all the injectors on the engine, may utilize a medium pressure pump (e.g., in the 500 PSI range) and a pre-heating coil for maintaining fuel in vapor form at a sufficiently low temperature (e.g., 400° F.) to minimize hydrocarbon cracking and degradation. In operation, the pre-heated, pre-vaporized fuel charge is introduced into either of the above injector configurations at the inlet point of the drive ram, thereby reducing the ram's required displacement, size, and heat input, thus allowing higher speed operation.

According to additional embodiments of the invention, the above-described medium pressure pump may be replaced by an external high pressure liquid feed pump that feeds the pre-heating coil through a one way valve. Small diameter capillary tubing and fittings may be used to reduce the volume in the hot section. The system may be purged on shut down to minimize the build up of carbon from excessively cracked fuels. Various combinations of components of the above described pump embodiments may be combined. For example, the number of stages of pumping and placement of pumps can vary widely based on engine size, number of cylinders, fuel recovery system geometry and other factors.

As an example of the combustion process, a 10 milligram charge of laboratory grade heptane may be dispensed by a conventional automotive common rail fuel injector into a hot chamber at about 750° F., wherein the hot chamber is lined with a small percentage of nickel and molybdenum. The hot chamber has residual oxygen amounting to less than five percent of the weight of the fuel. A ram progressively compresses the fuel charge to approximately 100 bar as the fuel vaporizes, and the fuel is then dispensed into the center of a 3" diameter by 2" deep cup which is open to the atmosphere at sea level. Tangentially to the cup, a computer controlled heat gun provides air at about 750° F. in a swirl pattern of approximately 30 rotations per second. Upon injection, the gas column formed by a 0.040" diameter nozzle opening to a 0.10" diameter collimator auto-detonates within 1" of the nozzle tip, dispersing the remaining fuel charge laterally into the swirl thereby filling the containment cup with lean burn combustion. The containment cup is representative of a typical 500 cc cylinder as found in a 2 liter, 4 cylinder high swirl automotive diesel engine.

Heat release analysis from infrared sensors and audio shockwave indicates that the burn rate is at least 100 times faster than laboratory combustion bomb data for conventional aerosol injection of heptane at the same pressure and air temperature. Auto ignition at 1 atmosphere indicates that this combustion scheme can be used in conventional air throttled (Otto Cycle) engines at idle where the peak cylinder pressure is only about 1 atmosphere. Standard laboratory combustion bomb data indicates that increasing the compression ratio to 20:1 will speed up the combustion timing by about a factor of 100, thereby producing a burn rate more than adequate for use in open throttle (Diesel Cycle) engines. This indicates that the above-described combustion scheme may be used with minimum ignition delay in reciprocating piston internal combustion engines in a plurality of modes, including: (1) an air throttled, variable combustion pressure (Otto cycle) mode; (2) an open throttle fixed combustion pressure (Diesel cycle) mode; and (3) a mixed cycle mode.

In another example of the combustion process, a commercial single cylinder direct injection diesel engine (Yanmar L48V) was outfitted with an electronically controlled heated catalyzed fuel injector, in accordance with the principles set forth herein. The engine displaced 220 cubic centimeters at a peak compression of approximately 23:1. The injector nozzle matched a stock diesel fuel injector having a nozzle with four radial jets of the same size and orientation, such that the laboratory injector mimicked the stock diesel fuel injector at room temperature injector operation. The fuel employed was composed of approximately 60% laboratory cetane, 30% heptane, and 10% ethanol by volume. Injection pressure was approximately 100 bar and engine operation was monitored with an optical top dead center sensor, a Delphi automotive piezo knock sensor and a thermocouple based exhaust gas temperature sensor. The engine was operated at 1200 RPM electrically and then run to 1800 RPM. Four trial runs were performed (Cases I-IV), and a preferred electronic timing was determined in each instance for injection of the fuel charge with respect to top dead center.

In Case I, the commercial single cylinder direct injection diesel engine (including an electronically controlled fuel injector of the invention) was tested under room temperature injector operation (i.e., not under heated conditions). To initiate the combustion ignition, the electronic timing had to be advanced at least four milliseconds (ms) before top dead center (180° of cycle rotation). Additionally, the engine started erratically and accelerated slowly with heavy soot production, as is typical of a stock diesel engine. A preferred electronic timing was determined to be approximately 3.5 ms advanced. In other words, injection of the fuel charge should occur at about 3.5 ms before top dead center.

In Case II, the internal nickel molybdenum catalyst of the fuel injector was activated by operating the injector body at a temperature of approximately 750° F. In operation, the engine instantly fired and accelerated rapidly over a broad range of timing conditions. A preferred electronic timing was determined to be about 0.7 ms before top dead center, and the preferred timing was not sensitive to engine warm up. In addition, exhaust gas temperature was substantially lower than that found in Case I, indicating higher engine efficiency.

In Cases III and IV, the fuel mixture was changed to approximately 30% laboratory cetane, 60% heptane, and 10% ethanol by volume. In Case III (similar to Case I), the diesel engine including a fuel injector of the invention was tested under room temperature injector operation (i.e., not under heated conditions). At room temperature, the engine would not operate with this fuel mix.

In Case IV (similar to Case II), the internal nickel molybdenum catalyst of the fuel injector was activated by operating the injector body at a temperature of approximately 750° F. The engine instantly fired and accelerated rapidly over a broad range of timing conditions. A preferred electronic timing was determined to be about 0.7 ms before top dead center (similar to Case II), and the preferred timing was again not sensitive to engine warm up. Additionally, exhaust gas temperature was substantially lower than that found in Case II, indicating higher engine efficiency.

Thus, it is seen that an injector-ignition for an internal combustion engine is provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. Apparatus for dispensing fuel into a combustion chamber of an internal combustion engine, the apparatus comprising:

a heated fuel injector that dispenses the fuel at approximately top dead center during a power stroke of the engine;

wherein the injector catalyzes the fuel in a super-critical phase prior to injection into the combustion chamber.

2. The apparatus of claim 1, wherein ignition occurs in a fast burn zone at high fuel density such that a leading surface of the fuel is substantially completely burned within several microseconds.

3. The apparatus of claim 1, wherein the fuel injector precisely meters substantially instantly igniting fuel at a predetermined crank angle for optimal power stroke production.

4. The apparatus of claim 1, wherein the fuel is metered into the fuel injector, such that the fuel injector heats, vaporizes, compresses and mildly oxidizes the fuel, and then dispenses the fuel as a relatively low density gas column into the combustion chamber of the engine.

5. The apparatus of claim 1, wherein the engine includes the combustion chamber, and wherein the fuel injector is mounted approximately in the center of a cylinder head of the combustion chamber.

6. The apparatus of claim 5, wherein a fuel column of hot gas is injected into the combustion chamber, such that the fuel column is radially dispensed into a swirl and a leading surface of the fuel column auto-detonates.

7. The apparatus of claim 5, wherein the combustion chamber comprises a lean burn environment, wherein 0.1% to 5% of the fuel is pre-oxidized in the fuel injector by employing high temperature and pressure.

8. The apparatus of claim 7, wherein pre-oxidation within the fuel injector comprises the use of catalysts disposed on injector chamber walls and oxygen sources including oxygenating agents selected from the group consisting of MTBE, ethanol, other octane and cetane boosters, and other fuel oxygenator agents.

9. The apparatus of claim 8, wherein pre-oxidation further comprises a small amount of additional oxygen.

10. The apparatus of claim 9, wherein the additional oxygen is taken from air or from recirculated exhaust gas.

11. The apparatus of claim 4, wherein the fuel is oxidized to provide relatively low temperature auto-ignition sites within the dispensed fuel column, which supports the initiation of surface auto-detonation and subsequent lean burn within a temperature and pressure range compatible with conventional automotive engine construction materials.

12. The apparatus of claim 4, wherein the dispensed fuel column contains 0.1% to 5% pre-combustion radicals in the form $RO_2\bullet$ and $ROOH\bullet$, which are highly reactive, partially oxidized, cracked hydrocarbon chains from the initial fuel.

13. The apparatus of claim 1, wherein the fuel injector is mounted in place of a conventional direct diesel injector on an automotive diesel engine that operates at high compression ratios in the range of 16:1 to 25:1.

14. The apparatus of claim 13, wherein the engine employs compression heating by way of high compression ratios.

15. The apparatus of claim 13, wherein the fuel is selected from the group consisting of gasoline, diesel fuel, high cetane fuel, high octane fuel, heptane, ethanol, plant oil, biodiesel, alcohols, plant extracts, and combinations thereof.

16. The apparatus of claim 4, wherein the fuel is dispensed at approximately 100 bar and heated to a temperature above 750 degrees Fahrenheit.

17. Apparatus for dispensing fuel into a combustion chamber of a variable cycle engine in a multi-fuel vehicle, the apparatus comprising:

a heated fuel injector that dispenses the fuel into the combustion chamber at approximately top dead center during a power stroke of the variable cycle engine;

wherein the injector catalyzes the fuel in a gas phase or super-critical phase prior to injection into the combustion chamber;

wherein the variable cycle engine includes a smart fueling system having an ECU in communication with a filling station fueling pump.

18. The apparatus of claim 17, wherein the variable cycle engine includes an intermixed thermal energy recovery system for providing the injection of air, water, steam or other expandable media.

19. The apparatus of claim 17, wherein the variable cycle engine is adapted to operate with a wide range of fuels including gasoline, diesel fuel, high cetane fuel, high octane fuel, heptane, ethanol, plant oil, biodiesel, alcohols, plant extracts, and combinations thereof.

20. The apparatus of claim 17, wherein the ECU includes a wireless serial communications link for wireless communication with the pump.

21. The apparatus of claim 20, wherein the ECU communicates to the fuel pump a precise fuel mixture and amount of fuel in the tank, and in response, the fuel pump calculates appropriate refueling mixtures that are compatible with the remaining fuel in the tank and the vehicle's operational capabilities.

22. The apparatus of claim 20, wherein the smart fueling system is employed to offer customers one or more optimized fuel blends for refueling a multi fuel vehicle.

23. The apparatus of claim 20, wherein the ECU determines actual fuel performance during combustion using engine performance under load measurements, load sensors, and knock sensors.

24. The apparatus of claim 20, wherein the ECU is configured to maintain a log of all fuel loadings including a precise mixture of fuels, an amount pumped into the tank, fuel consumption, observed performance, and chronological climate conditions.

25. The apparatus of claim 20, wherein the vehicle is capable of dynamically adapting to various fuel mixtures under control of the ECU.

* * * * *